US00RE34826E

United States Patent [19]

Specht

[11] E Patent Number: Re. 34,826

[45] Reissued Date of Patent: Jan. 17, 1995

[54] WASTE OIL DELIVERY SYSTEM

[75] Inventor: Werner O. Specht, Sharpsville, Pa.

[73] Assignee: Thomas & Betts Corporation, Memphis, Tenn.

[21] Appl. No.: 142,530

[22] Filed: Oct. 22, 1993

Related U.S. Patent Documents

Reissue of:

[64] Patent No.: 5,058,512
Issued: Oct. 22, 1991
Appl. No.: 495,478
Filed: Mar. 19, 1990

[51] Int. Cl.[6] ..... F23G 7/04

[52] U.S. Cl. ..... 110/238; 431/208

[58] Field of Search ..... 431/208, 159; 110/238; 126/93

[56] References Cited

U.S. PATENT DOCUMENTS

| | | | |
|---|---|---|---|
| 4,308,854 | 1/1982 | Kroll | 126/93 |
| 4,385,621 | 5/1983 | Kroll | 126/93 |
| 4,797,089 | 1/1989 | Schubach et al. | 431/208 X |
| 4,877,395 | 10/1989 | Schubach et al. | 431/208 X |

FOREIGN PATENT DOCUMENTS 1109743 9/1981 Canada .

1112554 11/1981 Canada .

OTHER PUBLICATIONS

Shenandoah Catalog, "The Name To Trust For Used Oil Answers", 4 Sheets, Undated.

Clean Energy Inc. Catalog, "Clean Burn Multi-Oil Furnace", 4 Sheets, Undated.

Lenan Corporation Products Catalog, "A Waste To Energy Company", 8 Sheets, Undated.

WEDCO Catalog, "Free-Heat Multi-Oil Furnaces", 4 Sheets, Undated.

W.A.R.M. Corporation Catalog, "Waste Oil Heating Systems", 3 Sheets, Undated.

Sunfire Manufacturing Corporation Catalog, "Turn Your Waste Oil Into Free Heat", 4 Sheets, Undated.

*Primary Examiner*—Edward G. Favors
*Attorney, Agent, or Firm*—Thomas & Betts Corp.

[57] ABSTRACT

The distance between the combustion nozzle and the pump of a waste oil heater can be significantly increased by using a positive displacement pump which is proximate to the reservoir and remote from the nozzle, contary to the usual positioning of oil delivery pumps. The pump, which is not pressure regulated, thus pushes oil to the nozzle at a constant flow rate regardless of oil pressure at the nozzle.

15 Claims, 1 Drawing Sheet

WASTE OIL DELIVERY SYSTEM

Matter enclosed in heavy brackets [ ] appears in the original patent but forms no part of this reissue specification; matter printed in italics indicates the additions made by reissue.

BACKGROUND OF THE INVENTION

The present invention relates to a waste oil delivery system and more particularly to a simplified system for delivering waste oil to a burner or heater which may be located a long distance from and elevated well above an oil reservoir.

Numerous varieties of heaters or burners are known, and these include heaters and burners which utilize the combustion of oil to produce heat. Typically, the oil is delivered from an oil source or reservoir, such as a tank, to an orifice in a nozzle located adjacent to or in a combustion chamber. The nozzle and the orifice may mechanically atomize the oil (a so-called "hydraulic combustion system") and/or admix air to aerate it (a so-called "air atomizing combustion system") to produce an aerosol thereof. In either event, the oil, now mechanically broken up into micro-globules, is directed into the combustion chamber, where it is burned to produce heat.

Oil burners and heaters are often capable of combusting fuel oils ranging from No. 1 fuel oil—a volatile, distillate oil—to No. 6 fuel oil—a high-viscosity fuel—to waste oils. Prior art fuel oil delivery systems have utilized a single pump, located physically near the burner or heater. The low side of the pump is connected to a line to which the pump applies a negative pressure (about 10–12 inches of mercury) to pull the fuel oil into the pump. Thereafter, the pump transmits the oil to its high side for subsequent delivery through a delivery line to the nozzle or its orifice. A practical limit on the maximum distance between the fuel reservoir and the low side of the pump is imposed by the physics of lifting liquids by negative pressure. This practical limit is a head lift of about fourteen feet. Thus, the use of single pump prior art fuel oil delivery systems is limited to residences and commercial buildings of moderate height (where the tank is at or near ground level) or to the ground level of a building (where the tank is buried). Higher buildings or deeper tank depths require multiple, or booster, pump systems, or multiple tanks and delivery systems periodically spaced throughout the levels of the building.

Thus, one hallmark of prior art oil delivery systems is a reliance on "pulling" fuel oil to the burner or heater.

The type pump most often found in prior art oil delivery systems typically regulates its output pressure to a selected value by means of an internal or adjunct pressure regulator. A relief valve or similar relief device, may also be provided to bypass excess oil, that is, oil in excess of that required to maintain the selected output pressure, back to the reservoir. The output pressure at the high side of the pump is usually with the range of 75–300 pounds per square inch where the oil is non-waste oil which is burned in a hydraulic combustion system. Where the fuel oil is waste oil or other oil burned in an air atomizing combustion system, the pressure of the oil at the high side of the pump is maintained by the pump at about 10 pounds per square inch.

The high side of the pump in a prior art fuel oil delivery system moves pressure-regulated fuel oil through the line connected thereto to the nozzle. The amount of pressure regulation or bypassing which occurs at the pump varies at the viscosity of the oil. Viscosity, in turn, is dependent on the inherent characteristics of the fuel oil (e.g., its chemical make-up) and the temperature thereof. Because of these variables, the flow rate of the fuel oils to the nozzle is difficult to control by pressure regulation.

The range of pressures which may be experienced at the high side of the pump and the difficulty in controlling the flow rate of the fuel oil to the nozzle has led to the use of pressure regulators in the high side line between the pump and the nozzle. Such regulators maintain the pressure of the fuel oil delivered to the nozzle within a range of about 3 to 5 pounds per square inch. Typically, the regulator is "automatic" and regulates the upstream pressure of the fuel oil as the pressure of the oil delivered to the nozzle varies.

In order to "match" the amount of oil delivered to the nozzle and the requirements of the particular combustion zone with which the nozzle is used, the size of the orifice in the nozzle may be appropriately selected.

Thus, another hallmark of prior art fuel oil delivery systems is the reliance on pressure regulation and orifice size to control and regulate the flow rate of fuel oil to the nozzle.

The above-described limitation on the distance from which, and the height to which, fuel oil may be delivered, the difficulty in controlling flow rate of fuel oil to a nozzle, and the need to rely on pressure regulation and orifice site to achieve desired oil flow are factors adversely affecting the applicability and economy of present fuel oil burner and heater systems. An object of the present invention is to eliminate or ameliorate these factors by the use of a simple, economical fuel oil delivery system.

SUMMARY OF THE INVENTION

With the above and other objects in view, the present invention contemplates a simple heating oil delivery system for delivering waste oil from a source of oil to a burner or heater. The burner or heater may be located a long distance from and/or may be elevated well above the reservoir, which may be storage tank, which is located above ground or is buried. The oil delivery system is similar only in a general way to prior art systems: it delivers fuel oil from the reservoir to a combustion zone of a heater or burner, and the fuel oil is introduced into the combustion zone following atomization thereof upon exiting an orifice of a nozzle. However, in prior systems: (1) the oil is received in the orifice at a predetermined pressure due to the action of pressure regulation upstream of the nozzle and (2) the predetermined pressure and the size of the orifice control the flow rate of the oil out of the orifice and into the combustion zone. Neither of the two foregoing characteristics apply to the present invention.

The delivery system of the present invention is particularly adapted for use with an air-atomizing combustion system which burns waste oil, although other oils may be used. A positive displacement metering pump, which includes no pressure-regulating or by-pass facilities, is usually located physically close to the oil reservoir and remote from the nozzle. The pump removes the oil from the source and thereafter pushes the oil to deliver it to the nozzle. The oil is delivered to the nozzle at a constant flow rate regardless of its pressure in the orifice or the size of the orifice. No pressure-regulating facilities between the pump and the nozzle are utilized.

The distance between the pump and the nozzle may exceed fourteen feet and may be about one-hundred feet or more. Heating pads adjacent the delivery line between the pump and the nozzle may heat the oil. Preferably, the pads are located proximate to the nozzle.

DETAILED DESCRIPTION

Figure 1:
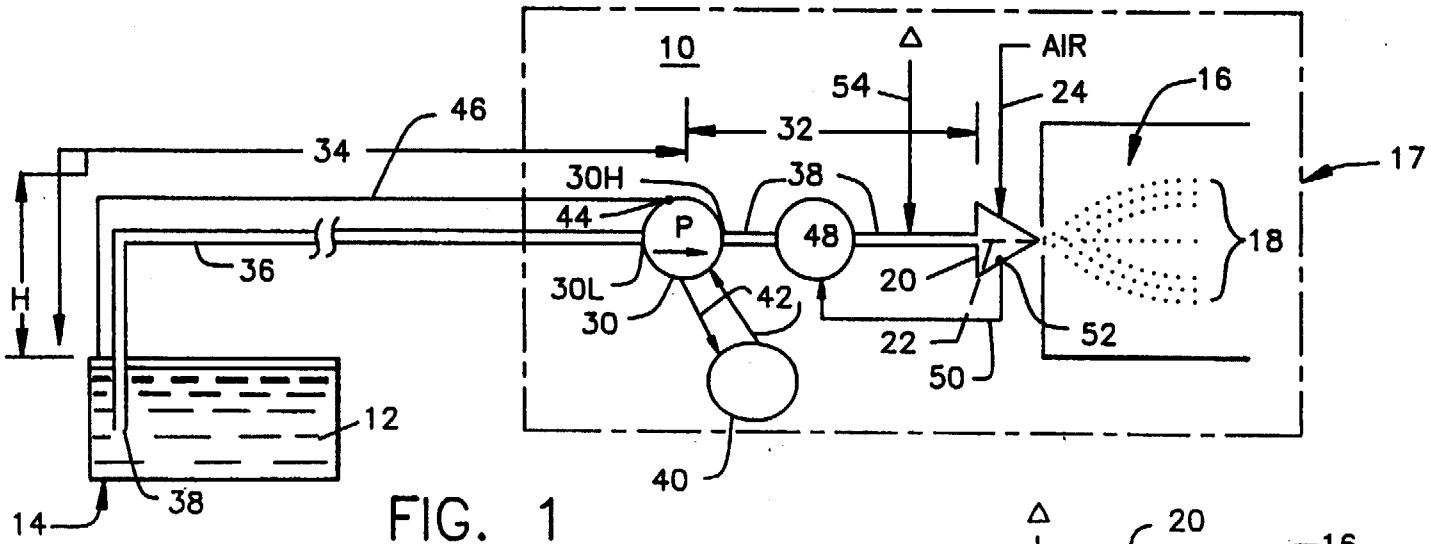
FIG. 1 [PRIOR ART]
FIG. 1 is a schematic view of a fuel oil delivery system according to the prior art.

Referring to FIG. 1, there is schematically depicted a fuel oil delivery system 10 according to the prior art. The delivery system 10 delivers fuel oil 12 from source or reservoir 14 thereof, such as a tank, to a combustion zone 16 of a burner, heater or similar heat-producing system 17. The fuel oil 12 is introduced into the combustion zone 16 in atomized form 18.

Atomization 18 of the oil 12 is effected by a nozzle 20 having an orifice 22 therein through which the oil 12 passes. If the system 10 is a so-called "hydraulic" system, atomization 18 of the oil 12 is achieved by its passage through and out of the orifice 22. If the system 10 is a so-called air-atomizing system, air is admixed with the oil 12 in the orifice 22, as depicted at 24, to aerate it. In either event, the atomized oil 18, now broken up into micro-globules, is burned within the combustion zone 16 to produce heat.

Typically, the oil 12 is removed from the reservoir 14 by the action of a pump 30. In standard arrangements, the pump 30, the nozzle 20 and other related elements of the burner 17 are physically proximate and are included in a common "package" comprising the burner system 17. More specifically, the distance 32 between the pump 30 and the nozzle 20 is relatively short, while the distance 34 between the pump 30 and the reservoir 14 is relatively substantially longer. The oil 12 is drawn from the reservoir 14 by the pump 30 applying a negative pressure via its low side 30L to a line 36, an inlet 38 of which is immersed in the oil 12. As is well known, this type of pumping, termed herein as "pulling" is limited by physical considerations to lifting the oil 12 to a height H no greater than about fourteen feet. The oil 12 pulled into the pump 30 is then forced from the high side 30H thereof, through a line 38 to the proximate nozzle 29.

The pump 30 is usually pressure-self-regulated. That is, a pressure regulator 40, which may be internal to the pump 30 or which may be an external adjunct to the pump 30, regulates, as shown by the arrows 42, the pressure of the oil 12 at the high side 30H of the pump 30 and in the line 38 to a selected value. Pump 30, as used in prior art systems 10, may also utilize pressure-relief facilities 44, which by-pass the oil internally or feed back excess oil 12 to the reservoir 14 through a line 46. Often, due to factors related to the characteristics of the pump 30 (e.g., pulsing), the oil (e.g., viscosity) or other elements of the system 10 additional pressure regulation is utilized. To that end, the line 38 may include a pressure regulator 48, which controls the pressure of the oil 12 delivered to the nozzle 20, in accordance with regulation input, diagrammatically shown at 50, sent from a sensor 52, associated with the nozzle 20 and its orifice 22, to the regulator 48.

Where the system 10 is used with hydraulic combustion and the oil 12 is non-waste oil, the pressure of the oil 12 at the high side 30H of the pump 30 is typically within a range of 75–300 lb/in$^2$. If the system 10 is used with air-atomizing combustion and delivers waste oil, this pressure is about 10 lb/in$^2$. The regulator maintains the pressure of the oil 12 delivered to the nozzle 20 to between about 3–8 lb/in$^2$.

If required, as may be the case where the oil 12 is waste oil, the oil in the line 38 is heated, as shown by the arrow 54, in any convenient manner.

Prior art oil delivery systems 10 are, therefore, characterized by:

(1) Delivery fuel oil 12 by pulling it from the reservoir 14—this limits the height H to which the oil 12 can be lifted; and (2) Reliance on pressure regulation, in the pump 30 and/or via pressure regulation facilities 48, 50, 52, and the size of the orifice 22 to control the flow rate of the oil 12 into the combustion zone 16—This renders the system 10 expensive and complicated, and, nevertheless, often results in poor or improper flow rates of the oil 12.

Figure 2:
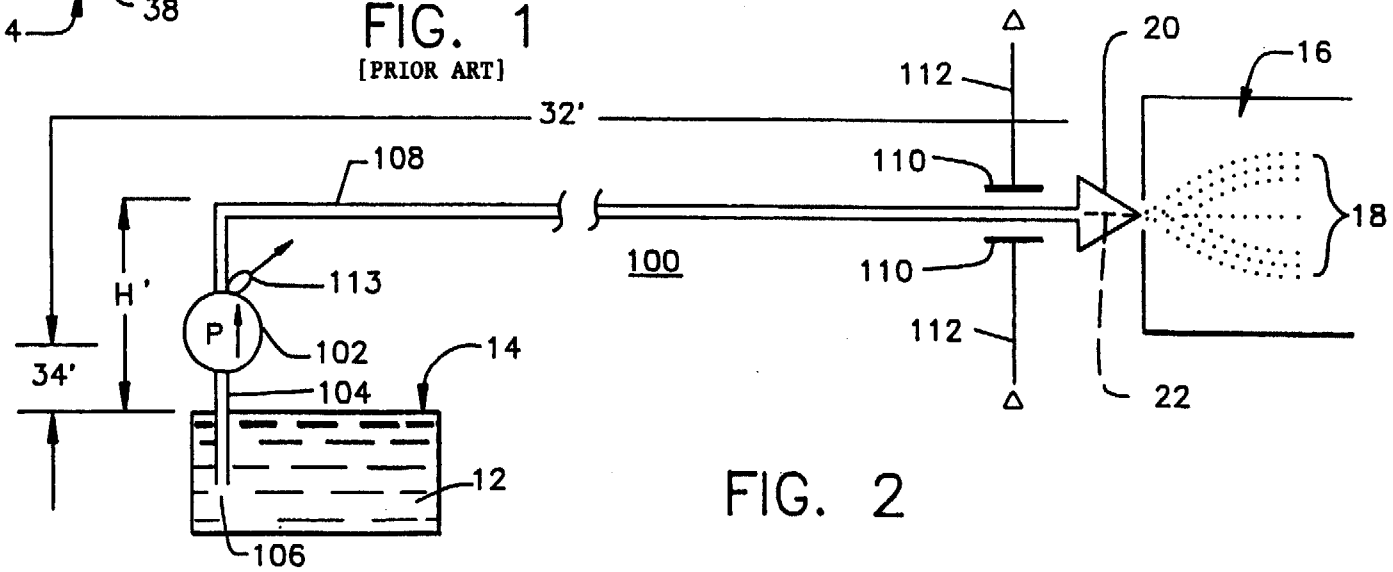
FIG. 2 is a schematic view of a fuel oil delivery system according to the present invention.

A system 100 according to the present invention is shown in FIG. 2, wherein like reference numerals denote similar elements to those in FIG. 1. The system 100 achieves improved delivery of oil 12 to the combustion zone 16 by virtue of the simplification and rearrangement of the system 10 of FIG. 1.

A pump 102 is used to move oil 12 from the reservoir 14 to the nozzle 20 for burning in the combustion zone 16. The pump 102 is preferably a positive displacement, metering pump and may be a gear pump, such as a ring gear pump of the type available from Sun Tec Industries under the designation fuel pump. The pump 102 may be basically similar to the pump 30, but it includes no pressure-regulation facilities 40, 42. The pump 102 draws the oil 12 from the reservoir 14 via a line 104 having an inlet 106 and delivers the oil 12 to the nozzle 20 via a line 108. The pump 102 is located proximate to the reservoir 14 and is not usually proximate to the nozzle 20. This locational change from the prior art system 10 of FIG. 1 permits oil 12 to be delivered to great heights H and/or to nozzles 20 located substantial distances away therefrom. Thus, in contrast to FIG. 1, the pump-to-reservoir distance 34 has been shortened to 34′ and nearly eliminated, while the pump-to-nozzle distance 32 has been lengthened to 32′ with oil lifts H′ far greater than H being achievable.

The metering pump 102 of the system 100 "pushes" the oil 12 to the nozzle 20. Because of this and the foregoing considerations, the flow rate of the oil 12 to the nozzle 20 is a function of the design and operating parameters of the pump 102 and not of pressure. Accordingly, the pressure-regulating facilities 48, 50, 52 as well as those 40, 42 associated with the pump 30 are eliminated. The size of the orifice 22 also does not, within practical limits, i.e., excluding orifices of zero (or extremely small) or infinite (or extremely large) diameter, determine the flow rate of the oil 12 into the combustion zone 16.

The foregoing improved system 100 is particularly adapted to deliver waste oil 12 to the nozzle 20. Where required for reasons of viscosity, low volatility or otherwise, the waste oil may be heated to a selected temperature by heating pads 110, located proximate to the nozzle 20, as shown by arrows 112.

A pressure relief valve 113 is installed on the push side of the pump 102 to provide pressure relief in the event of blockage in the supply line 108 or nozzle 20.

I claim:

1. An Improved oil delivery system of the type which delivers fuel oil from a reservoir thereof to a combustion zone into which atomized oil is introduced through a orifice in a nozzle, the orifice receiving the oil at a predetermined flow rate; wherein the improvement comprises:

a non-pressure-regulated, positive displacement, metering pump located physically close to the reservoir and remote from the nozzle for removing the oil from the reservoir and for pushing the oil towards the nozzle to deliver the oil to the orifice at a constant flow rate notwithstanding the pressure of the oil in the orifice or the size of the orifice, there being no pressure regulator located between the metering pump and the orifice, and the vertical distance between the pump and the nozzle being greater than fourteen feet.

2. An improved oil delivery system of the type which delivers fuel oil from a reservoir thereof to a combustion zone into which atomized oil is introduced through an orifice in a nozzle, the orifice receiving the oil at a predetermined flow rate; wherein the improvement comprises:

a non-pressure-regulated, positive displacement, metering pump located physically close to the reservoir and remote from the nozzle for removing the oil from the reservoir and for pushing the oil towards the nozzle to deliver the oil to the orifice at a constant flow rate notwithstanding the pressure of the oil in the orifice or the size of the orifice, there being no pressure regulator located between the metering pump and the orifice, and the horizontal distance between the pump and the nozzle being about one-hundred feet or more.

3. An oil delivery system as in claim 1, which further comprises:

means located between the pump and the orifice for heating the oil delivered to the orifice.

4. An oil delivery system as in claim 1, wherein: the oil is waste oil.

5. An oil delivery system as in claim 4, wherein: the nozzle is an air-atomizing nozzle.

6. An oil delivery system as in claim 4, wherein: the nozzle is a hydraulic atomizing nozzle.

7. An oil delivery system as in claim 2, which further comprises:

means located between the pump and the orifice for heating the oil delivered to the orifice.

8. An oil delivery system as in claim 2, wherein: the oil is waste oil.

9. An oil delivery system as in claim 6, wherein: the nozzle is an air-atomizing nozzle.

10. An oil delivery system as in claim 8, wherein: the nozzle is a hydraulic atomizing nozzle.

*11. An improved oil delivery system of the type which delivers fuel oil from a reservoir thereof to a combustion zone into which atomized oil is introduced through an orifice in a nozzle, the orifice receiving the oil at a predetermined flow rate; wherein the improvement comprises:*

*a non-pressure-regulated, positive displacement, metering pump located physically close to the reservoir and remote from the nozzle for removing the oil from the reservoir and for pushing the oil towards the nozzle to deliver the oil to the orifice at a constant flow rate notwithstanding the pressure of the oil in the orifice or the size of the orifice, there being no pressure regulator located between the metering pump and the orifice, said metering pump comprising the exclusive means for controlling said oil flow rate through said nozzle.*

*12. An oil delivery system as in claim 11, which further comprises:*

*means located between the pump and the orifice for heating the oil delivered to the orifice.*

*13. An oil delivery system as in claim 11, wherein: the oil is waste.*

*14. An oil delivery system as in claim 13, wherein: the nozzle is an air-atomizing nozzle.*

*15. An oil delivery system as in claim 13, wherein: the nozzle is a hydraulic atomizing nozzle.*

* * * * *

Disclaimer and Dedication

Re. 34,826—Werner O. Specht, Sharpsville, Pa. WASTE OIL DELIVERY SYSTEM. Patent dated Jan. 17, 1995. Disclaimer and Dedication filed May 29, 1998, by the assignee, Thomas & Betts Corp.

Hereby disclaims and dedicates to the Public claims 11-15 of said patent.

*(Official Gazette,* September 8, 1998)